United States Patent
Makin et al.

(10) Patent No.: US 9,414,209 B2
(45) Date of Patent: Aug. 9, 2016

(54) AUTOMATIC DELIVERY OF MESSAGES

(71) Applicant: Convergys Customer Management Delaware LLC, Cincinnati, OH (US)

(72) Inventors: Rod Makin, Bolton (GB); Andrew P. Smith, Knutsford (GB); John Bunyan, Macclesfield (GB)

(73) Assignee: Convergys Customer Management Delaware LLC, Cincinatti, OH (US)

( * ) Notice: Subject to any disclaimer, the term of this patent is extended or adjusted under 35 U.S.C. 154(b) by 0 days.

(21) Appl. No.: 14/643,877

(22) Filed: Mar. 10, 2015

(65) Prior Publication Data
US 2015/0312734 A1    Oct. 29, 2015

Related U.S. Application Data

(63) Continuation of application No. 13/232,082, filed on Sep. 14, 2011, now abandoned.

(60) Provisional application No. 61/308,471, filed on Feb. 26, 2010.

(51) Int. Cl.
*H04W 4/14*   (2009.01)
*H04L 12/58*  (2006.01)
*H04W 8/12*   (2009.01)

(52) U.S. Cl.
CPC ................. *H04W 4/14* (2013.01); *H04L 51/14* (2013.01); *H04L 51/30* (2013.01); *H04W 8/12* (2013.01); *H04L 51/18* (2013.01); *H04L 51/38* (2013.01)

(58) Field of Classification Search
CPC ...................................... H04W 4/14
See application file for complete search history.

(56) References Cited

U.S. PATENT DOCUMENTS

| | | | | |
|---|---|---|---|---|
| 2006/0089165 A1* | 4/2006 | Smith | ................... | H04W 92/02 455/466 |
| 2007/0105531 A1* | 5/2007 | Schroeder | ......... | H04M 3/42008 455/411 |
| 2008/0081617 A1* | 4/2008 | Yoo | ................... | H04M 3/42008 455/433 |
| 2009/0049202 A1* | 2/2009 | Pattison | ................. | H04L 12/66 709/249 |
| 2009/0225732 A1* | 9/2009 | Begall | ................ | H04W 88/184 370/338 |
| 2010/0087171 A1* | 4/2010 | Ala-Luukko | ....... | H04W 88/184 455/412.1 |
| 2011/0294472 A1* | 12/2011 | Bramwell | ............... | H04W 8/04 455/413 |
| 2013/0281136 A1* | 10/2013 | Mikan | .................... | H04W 4/14 455/466 |

* cited by examiner

*Primary Examiner* — Vladimir Magloire
*Assistant Examiner* — Frank Donado
(74) *Attorney, Agent, or Firm* — Crowe & Dunlevy, P.C.

(57) ABSTRACT

Using components such as intermediate short message service centers and active subscriber identity systems, it is possible to deliver a message to a subscriber at a number different from the number which was entered by the message's sender at the time the message was sent. These components can also be used to deliver the message in the event that the sender is unavailable at the time the message is originally sent. Communications between components can be performed in a variety of manners, including using proprietary IP protocols, and the components can be configured to take responsibility for retrying message delivery by providing a delivery confirmation once the message reaches them, rather than providing delivery confirmation once it reaches its ultimate recipient.

10 Claims, 11 Drawing Sheets

AUTOMATIC DELIVERY OF MESSAGES

CROSS REFERENCE TO RELATED APPLICATIONS

This application is a continuation of U.S. application Ser. No. 13/232,082, entitled "Automatic Delivery of Messages," and filed on Sep. 14, 2011, which itself claims the benefit of PCT Application PCT/US2011/26262, which itself claims the benefit of U.S. provisional patent application 61/308,471, entitled "Automatic Delivery of Messages" and filed on Feb. 26, 2010. The disclosures of each of those applications are hereby incorporated by reference in their entirety.

FIELD

The technology disclosed herein can be implemented in the field of reliable data delivery in telecommunications networks.

BACKGROUND

Ordinarily, SMS messages are communicated from a message sender to a message recipient in the following manner, defined by Global System for Mobile Communications (GSM) technical specification 03.40. First, the sender creates a message to be delivered (e.g., by typing it into the keypad of a mobile telephone), and specifies the recipient for the message (e.g., by typing a mobile phone number for the intended recipient of the message). The message would then be sent from the sender to his or her SMS service center (SMSC) which would query a database called a home location register (HLR) to identify how to route the message, and would then send the message to the intended recipient based on the information received from the HLR. If the recipient receives the message (e.g., it was sent to a mobile phone which was on and had an active subscription), the SMSC would receive a delivery confirmation message. If the recipient does not receive the message (e.g., if it was sent to a mobile number which was turned off), then the SMSC would retry sending the message until it either receives a delivery confirmation, or a predefined message storage period (e.g., two weeks) expires.

While the above approach has proved effective in delivering messages in cases where a recipient can be located accurately using information in the HLR, it is not always sufficient in more complex scenarios. For example, if an intended recipient has multiple numbers, an SMS message addressed to one of the recipient's inactive numbers might not reach the recipient (or might only reach the recipient if the recipient reactivates the inactive number), even though the recipient might have an active subscription when the SMS message was sent. Similarly, in cases where the number for an intended recipient is mutable (e.g., where a subscriber can switch between active numbers), the standard delivery and retry mechanisms could fail, with the SMSC trying to redeliver the message to the original (inactive) number, rather than being able to adapt to the changes made by the subscriber. As a result, there is a need in the art for technology which can allow SMS messages to be delivered properly even in cases where a recipient has multiple (potentially changeable) numbers.

SUMMARY

The disclosed technology can be implemented in a variety of manners. For example, based on the disclosure set forth herein, one of ordinary skill in the art could implement a machine comprising a processor, a network interface, and a memory storing instructions which, when executed by the processor, are operable to cause a set of acts to be performed. Such acts could comprise parsing a message received via the network interface, and sending a delivery confirmation in response to receiving the message. Further, based on the disclosure set forth herein, the delivery confirmation could be sent before providing the message to the message recipient. Corresponding methods could be performed, and computer readable media could also be implemented. Additionally, other types of machines, compositions of matter, articles of manufacture, and methods could be performed or implemented without undue experimentation by those of ordinary skill in the art based on the disclosure set forth herein. Accordingly, the summary provided above should be treated as illustrative only, and not limiting.

BRIEF DESCRIPTION OF THE DRAWINGS

The accompanying drawings incorporated in and forming a part of the specification illustrate aspects of various implementations of the inventors' technology. Of course, it should be understood that the inventors' technology is not limited to the precise arrangements shown. In the drawings.

DETAILED DESCRIPTION

The inventors have developed novel technology which can be used in the delivery of messages. To illustrate, the following disclosure describes various embodiments which can be implemented based on the inventors' technology and which represent improvements on existing approaches to message delivery. It should be understood that the technology developed by the inventors can be used in various contexts other than those explicitly disclosed, and can be implemented in ways which vary from the explicit disclosure set forth herein, but which will be immediately apparent to those of ordinary skill in the art based on this disclosure. Accordingly, this disclosure should be understood as being illustrative only of the inventors' technology, and should not be treated as implying limits on the same.

Figure 1:
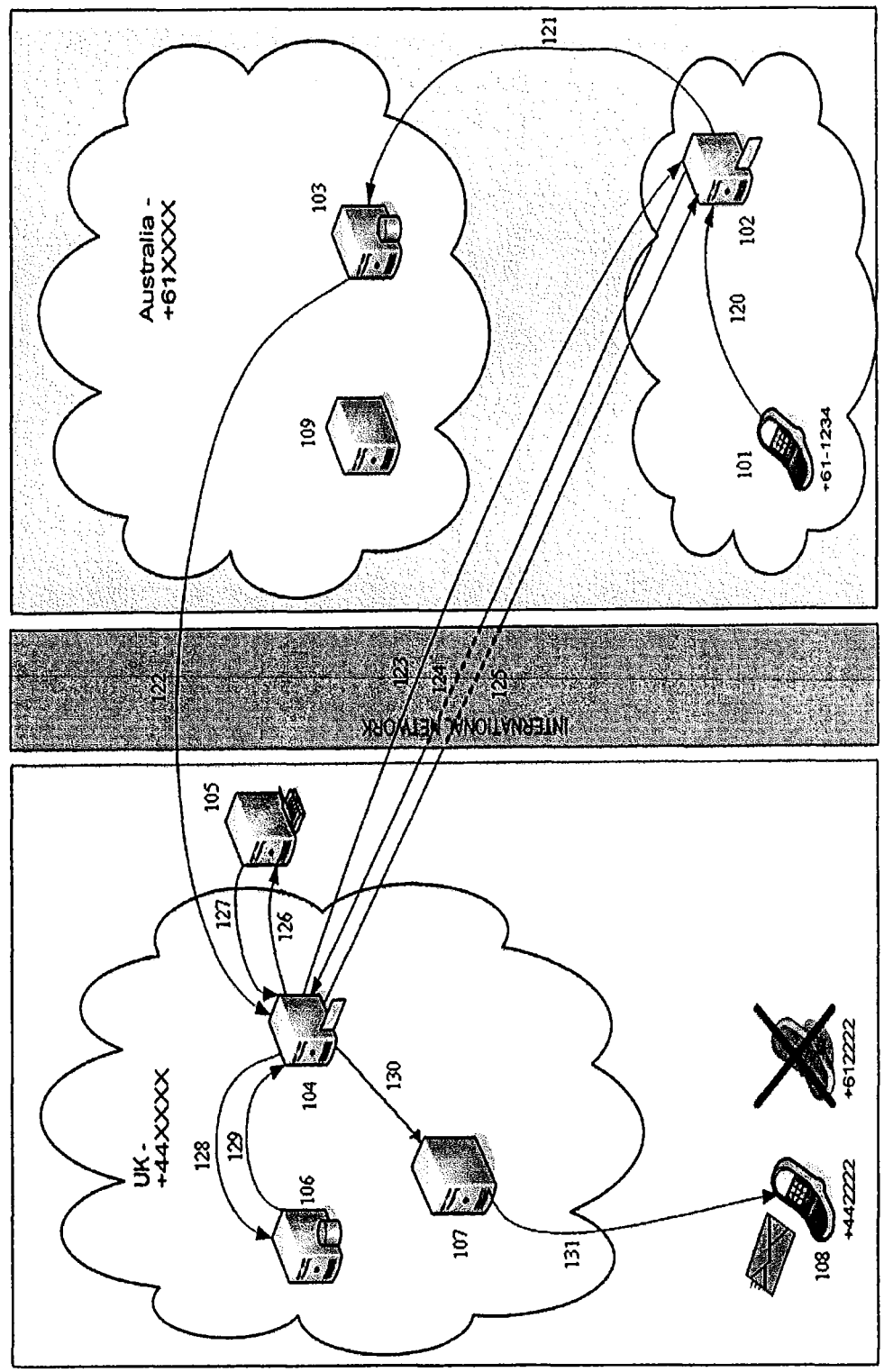
FIG. 1 shows components and communications which can be used to deliver a message to a recipient at a number other than that entered by the sender of the message.

Turning now to FIG. 1, that figure depicts components which can be used in delivering an SMS message to a subscriber with multiple numbers when the subscriber's active number is different from the number the SMS was addressed to. In practice, this might occur when the subscriber has an acquaintance in one geographic area (e.g., Australia, as depicted), who is aware only of the subscriber's number in that geographic area (e.g., 612222). If the subscriber's active number at the time the SMS was sent was not in the sender's geographic area (e.g., the subscriber was in the UK, rather than Australia) a mechanism would be necessary to have the message delivered to the subscriber's active number (e.g., 44-2222), rather than to the number entered by the sender. The components depicted in FIG. 1, along with the illustrated data communications, can be used to provide this mechanism.

In FIG. 1, an SMS message would initially be created by entering it, and the number associated with the subscriber in the sender's geographic area (in this case 61-2222), into the sender's mobile device [101]. This information would then be sent [120] to the sender's serving SMSC [102] which would query [121] the serving HLR [103] to establish a location for the recipient based on the number entered by the sender (i.e., 612222). The serving HLR [103] would recognize the recipient number as being associated with a subscriber having multiple numbers, and would (e.g., per a previous agreement between the entity maintaining the serving HLR [103] and the subscriber's service provider) forward the request [122] from the sender's serving SMSC [102] to a second SMSC [104] maintained by the subscriber's service provider. The second SMSC [104] would then send [123] the sender's serving SMSC [102] a response to its query. In that response, the second SMSC [104] would indicate that the SMS should be delivered to the second SMSC [104].

Once the message had been sent [124] to the second SMSC [104], the second SMSC [104] would send a delivery confirmation message [125] to the sender's serving SMSC [102], indicating that the message had been successfully delivered. The second SMSC [104] would then send [126] the message (e.g., via short message peer to peer protocol, otherwise known as SMPP), along with a request to identify the handset of the subscriber which is currently active, to an active subscriber identity system [105]. The active subscriber identity system [105] would respond by sending a message [127] to the second SMSC [104] which would inform the second SMSC [104] of the number for the subscriber which is currently active (in this case, 44-2222). Once it received the currently active number, the second SMSC [104] would query [128] its local HLR [106] for the mobile switching center (MSC) [107] serving the subscriber's currently active number. Once the address for the MSC [107] had been sent [129], the second SMSC [104] would send [130] the MSC [107] the subscriber's active number, and the message originally entered into the sender's mobile device [101]. The MSC [107] would then deliver [131] the message to the subscriber's mobile device [108] despite the fact that the active number on that device (in this case, 44-2222) was different from the number the SMS message had originally been sent to (61-2222).

Figure 2A:
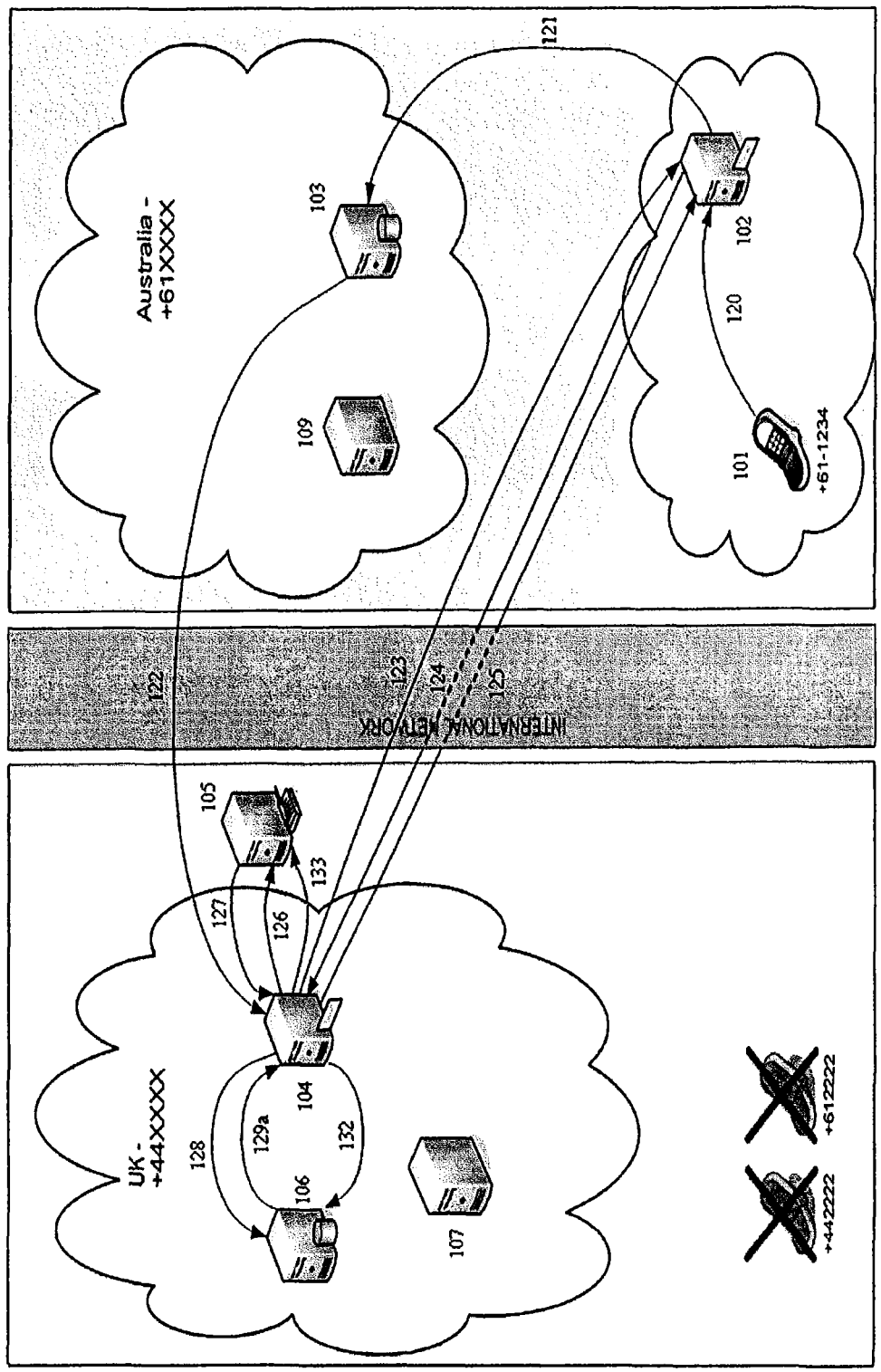
FIGS. 2a-2b show components and communications which can be used in delivering a message to a recipient who is unavailable at the time the message is sent.

Of course, it should be understood that components such as depicted in FIG. 1 could be used for more than simply delivering an SMS message to a recipient at an active number other than the number entered when the SMS message was composed. For example, in some cases, components such as shown in that figure (or variations on the same) could be configured to also handle situations in which an SMS message is sent when a subscriber is simply unavailable, rather than simply being available at a number other than that which was entered when the SMS message was originally sent. As an illustration of this, consider FIGS. 2a and 2b. FIG. 2a depicts a scenario which might take place when an SMS message is placed to a subscriber who is simply not available. As shown in FIG. 2a, the steps of this scenario could be largely the same as those discussed in FIG. 1 above (e.g., the serving HLR [103] forwards the request [122] from the sender's serving SMSC [102] to a second SMSC [104]; the second SMSC [104] sends a delivery confirmation [125] after the SMS had been sent [124] to the second SMSC [104]; etc). However, in the scenario in which the SMS is sent to a subscriber who is simply unavailable, after the second SMSC [104] queries [128] the local HLR [106] for the MSC associated with the subscriber's last known active number (in this case, 44-2222), the local HLR [106] would send back a message indicating that the subscriber's handset is not available [129a] (rather than sending back a message indicating the address for the MSC serving the subscriber's currently active number [129]). The second SMSC [104] would respond to the message that the subscriber's handset was not available by sending set message waiting data [132] to the local HLR [106]. The second SMSC [104] would also send a message [133] to the active subscriber identity system [105] indicating that the SMS had not been successfully delivered to the subscriber's last known active number.

Figure 2B:
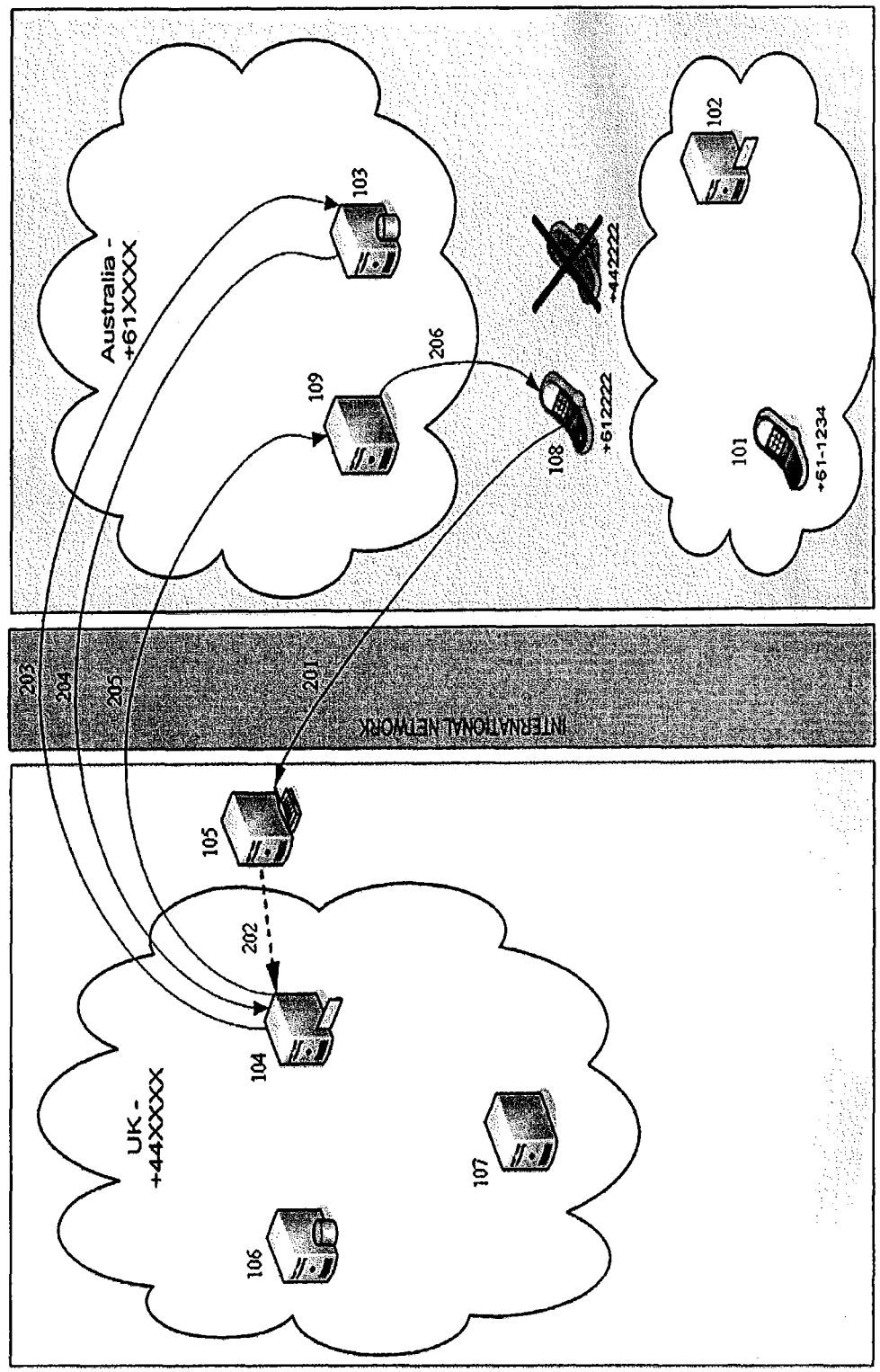

Turning now to FIG. 2b, that figure depicts steps which might take place to actually deliver a message to a subscriber who was unavailable during a previous delivery attempt. As shown in FIG. 2b, this process could start with a message being sent [201] from the subscriber's mobile device [108] indicating that the subscriber is active at a new number (in this case 61-2222). This could take place, for example, by a toolkit on the mobile device [108] automatically sending a message to the active subscriber identity system [105] when the subscriber uses it to modify his or her active number, or it could take place by some automatic means, such as a mobile telephone switching office (MTSO) sending a message to the active subscriber identity system [105] stating that the mobile device [108] has been detected when it powers up. Once the active subscriber identity system [105] receives the message, it could check to see if there were any SMS messages being held for the subscriber. Based on the information received previously [133] from the second SMSC [104], the active subscriber identity system [105] would know that there was an SMS message waiting for the subscriber, and would send a notification [202] to the second SMSC [104] indicating that the subscriber has become available to receive the message. The second SMSC [104] would then request [203] information from the HLR [103] serving the area where the mobile device [108] was located for routing the SMS to the mobile device. In response, the HLR [103] would send [204] a message indicating the MSC serving the mobile device [108]. Once that message was received by the second SMSC [104], it would send the SMS [205] to the appropriate MSC [109], which would deliver [206] it to the mobile device [108]. In this way, the SMS would be sent to the subscriber as soon as he or she is available, regardless of the number the message was originally sent to, and regardless of the number the subscriber had indicated was active (but which proved to be inactive) at the time of the SMS.

Figure 3:
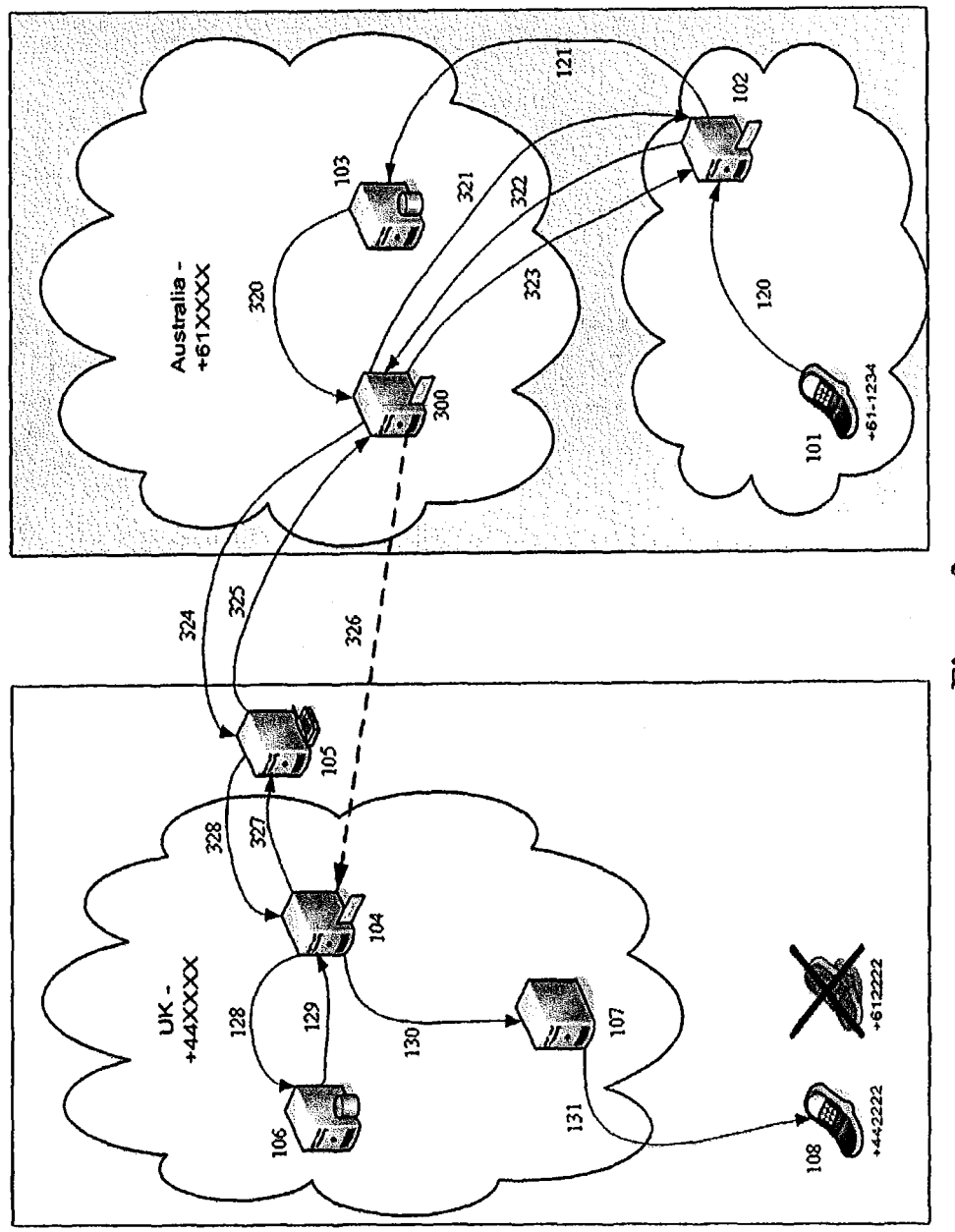
FIG. 3 shows components and communications which can be used to deliver a message to a recipient at a number other than that entered by the sender of the message.

Other variations, beyond simple inclusion of functionality for dealing with absent subscribers, are also possible. As an example of this, consider FIG. 3. FIG. 3 depicts a system in which an SMS message is delivered to a number other than the number entered when the message was originally created using different communications than discussed above with respect to FIG. 1. In FIG. 3, as in FIG. 1, an SMS message would initially be created by entering it, and the number associated with the recipient in the sender's geographic area (in this case, 61-2222) into the sender's mobile device [101]. The sender's serving SMSC [102] would then query [121] the serving HLR [103] to establish a location for the recipient, and, as was the case with FIG. 1, the serving HLR [103] would recognize the recipient number as being associated with a subscriber having multiple numbers. However, unlike in FIG. 1, in the diagram of FIG. 3, the serving HLR [103] would respond to the request by sending [320] the query to a local SMSC [300] maintained by the subscriber's service provider (again, this would likely take place based on a prior agreement between the entity maintaining the serving HLR [103] and the subscriber's service provider). The local SMSC [300] would then provide [321] its own address to the sender's serving SMSC [102] as a response to the initial query sent to the HLR [103]. The sender's serving SMSC [102] would send [322] the SMS to the local SMSC [300], and the local SMSC [300] would send a confirmation [323] indicating that the SMS had been successfully delivered.

Once the delivery confirmation had been sent [323], the local SMSC [300] would query [324] the active subscriber identity system [105] to determine the number at which the subscriber could be reached. For example, this could take place by the local SMSC [300] parsing the message to extract information identifying the message recipient (e.g., the phone number of the recipient entered into the mobile device [101] when the message was created) and asking for the active number for the subscriber associated with that information. The local SMSC [300] could also send the message itself to the active subscriber identity system [105] along with the query. The active subscriber identity system [105] could respond [325] to this query by sending the local SMSC [300] information such as the phone number (MSISDN) and international mobile subscriber identity (IMSI) which its records indicated were active for the subscriber, as well as an address for an SMSC (in this case, the second SMSC [104]) in the same geographic area as the subscriber's active number. The local SMSC [300] would then send [326] (e.g., via SMPP) the SMS message to the SMSC (in this case, the second SMSC [104]) indicated by the active subscriber identity system [105]. Once it had received the SMS message, the second SMSC [104] could (though it might not do so in all implementations) requery [327] the active subscriber identity system [105], which would return [328] the MSISDN and IMSI active at that time for the SMS recipient. Once that information had been returned, the system of FIG. 3 could complete the delivery process in the same manner as described for FIG. 1. That is, by querying the local HLR [106] for the MSC [107] serving the subscriber's currently active number, then sending the SMS to that MSC [107], and ultimately to the subscriber's mobile device [108].

Figure 4A:
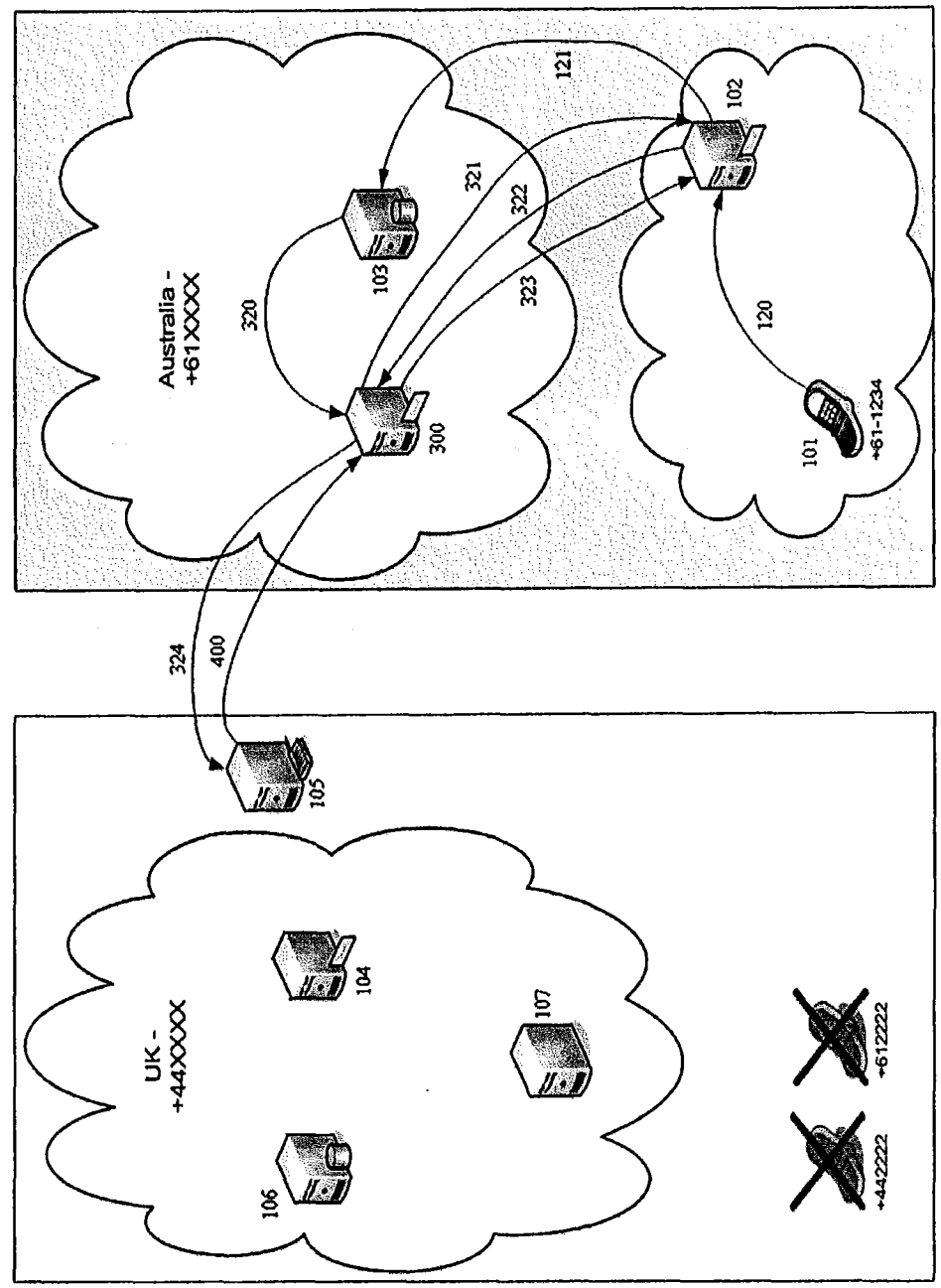
FIGS. 4a-4b show components and communications which can be used in delivering a message to a recipient who is unavailable at the time the message is sent.

Similarly, the approach illustrated in FIG. 3, where multiple SMSC's are configured to communicate with the active subscriber identity system [105] (e.g., because they are all owned by the same entity, or due to some pre-arrangement between the entities controlling the SMSC's and the active subscriber identity system [105]), can also be used in situations where an SMS is sent to a subscriber who is simply not available. As an illustration of how this might take place, consider FIGS. 4a and 4b. As shown in FIG. 4a, when a subscriber is simply not available (e.g., because he or she does not have a handset active), a system such as shown in FIG. 4a might function in exactly the same way as described for that figure except that the active subscriber identity system [105], rather than providing information about where the subscriber could be reached, responds to the query from the local SMSC [300] by sending a message [400] indicating that the subscriber is not available. This could result in the local SMSC [300] invoking a retry mechanism (e.g., requerying the active subscriber identity system [105] after a set period of time to determine if the subscriber had become available), or simply waiting until it received an alert from the active subscriber identity system [105] indicating that the subscriber had become available.

Figure 4B:
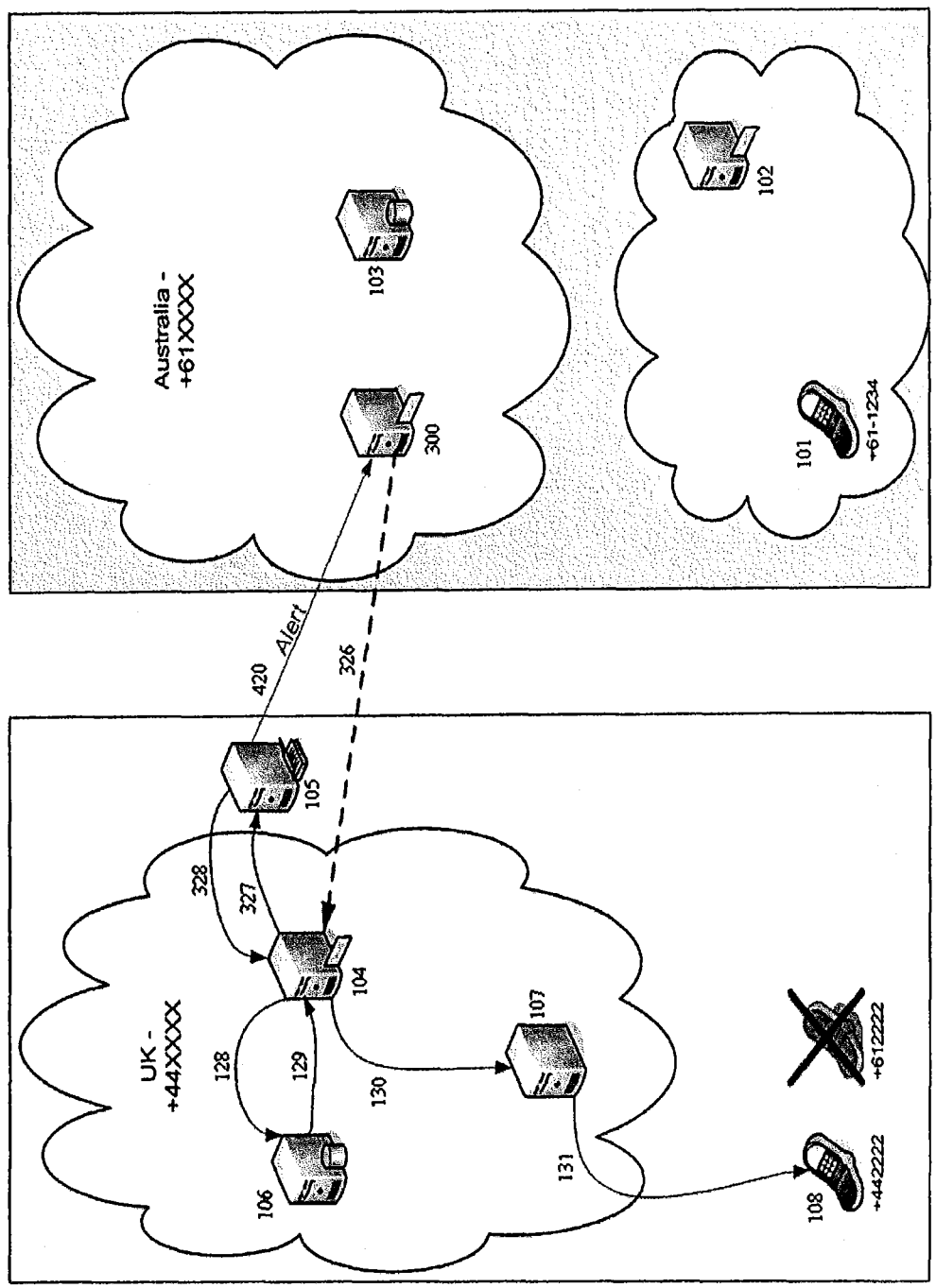

FIG. 4b then shows how the SMS from FIG. 4a could eventually be delivered once the subscriber becomes available. As shown in that figure, once the active subscriber identity system [105] discovers that the subscriber has become available (e.g., through a message sent by a toolkit, a message from an MTSO, etc), an alert [420] would be sent to the local SMSC [300] where the SMS had been delivered from the sender's serving SMSC [102] (in such an implementation, the active subscriber identity system [105] would previously have stored a flag or some other data indicating that there was a message waiting at the local SMSC [300] at the time that it was queried for the original SMS to the absent subscriber). This alert could include essentially the same information which would have been provided to the local SMSC [300] if the subscriber had been available when the original query was sent [324] (e.g., address of the second SMSC [104], subscriber's IMSI and/or MSISDN). With this data, the delivery of the message could proceed essentially as if the subscriber had been available when the message was originally sent. That is, the local SMSC [300] could send [326] the message and associated data to the second SMSC [104], the second SMSC [104] could requery [327] the active subscriber identity system [105] to verify that the information received from the local SMSC [300] was still accurate, and the message could be delivered using the communications described previously with respect to FIG. 1.

Of course, whether to use an approach such as shown in FIGS. 1, 2a and 2b, an approach such as shown in FIGS. 3, 4a and 4b, or some other approach than those pictured, will depend on a variety of factors, such as the costs of various communications and components, and requirements for speed and/or reliability. For example, an approach such as shown in FIGS. 3, 4a and 4b, can be used to help minimize the cost of communicating between jurisdictions. This can be achieved by using relatively inexpensive protocols (e.g., a proprietary IP protocol) to communicate between the local SMSC [300], the active subscriber identity system [105] and the second SMSC [104], which can avoid having to pay for international SMS delivery, such as might be necessary in the approach shown in FIGS. 1, 2a and 2b to communicate the SMS from the sender's serving SMSC [102] to the second SMSC [104]. Alternatively, an approach such as shown in FIGS. 1, 2a and 2b could be beneficial in cases where it is not possible to use multiple SMSCs which can communicate with the active subscriber identity system [105]. For instance, in situations where it is not economically justifiable to purchase SMSCs for different jurisdictions, or in situations where it is not possible to enter into agreements with entities that have SMSCs in multiple jurisdictions in which those entities agree to let their SMSCs be configured to perform functions such as shown in FIGS. 3, 4a and 4b. Of course, other approaches are also possible. For example, the approach shown in FIG. 4a could be modified so that, instead of the active subscriber identity system [105] informing the local SMSC [300] when the subscriber is not available, the active subscriber identity system [105] could inform the local SMSC [300] of the last active number at which the subscriber was available, and the discovery of the subscriber's unavailability could take place upon interaction with the relevant HLR and be handled as shown in FIG. 2a.

As another type of variation, in some cases, the local HLR [103], rather than forwarding a query from the sender's serving SMSC [102] to an intermediate SMSC (e.g., the local SMSC [300] or the second SMSC [104]), could be configured to send a response to the sender's serving SMSC [102] indicating the SMS should be sent to the appropriate intermediate SMSC (in the case of FIG. 1, the second SMSC [104]; in the case of FIG. 3, the local SMSC [300]). Similarly, in some cases, rather than sending the sender's serving SMSC [102] messages that the SMS had been delivered to a subscriber, when in fact it had only been delivered to an intermediate SMSC, it is possible that a delivery confirmation message could be sent to the sender's serving SMSC [102] only when the message is actually delivered to the subscriber. This could have the beneficial effect of making the sender's serving SMSC [102] responsible for retries in the event of an absent subscriber, thereby relieving the intermediate SMSCs (i.e., the second SMSC [104] and the local SMSC [300]) of the need to store messages. However, it would have the potential drawback that the retry mechanism used by the sender's serving SMSC [102] might rely on activation of the number that the SMS message is sent to, rather than being triggered by activation of other numbers where the subscriber could be reached.

While this potential drawback can be addressed (e.g., by telling subscribers that, when travelling between countries, when they land they should turn on the ID from the country they travelled from for 15 minutes after they arrive, thereby giving the opportunity to register with the HLR where a message may potentially be waiting; configuring the active subscriber identity system [105] so that whenever any number where the subscriber can be reached becomes active, a message is sent to all HLRs where a message may be waiting indicating that the retry mechanism should be triggered), these approaches of addressing the drawbacks would be weighed against the potential benefits (e.g., avoiding storage costs, ability to use low cost protocols in some implementations) in deciding the details of a particular implementation. Accordingly, it should be understood that the discussion set forth above, as well as the approaches shown in FIGS. 1, 2a, 2b, 3, 4a, and 4b are intended to be illustrative only, and that the protection accorded by this document, or by documents claiming the benefit of this document should not be limited to their specific details.

Figure 5:
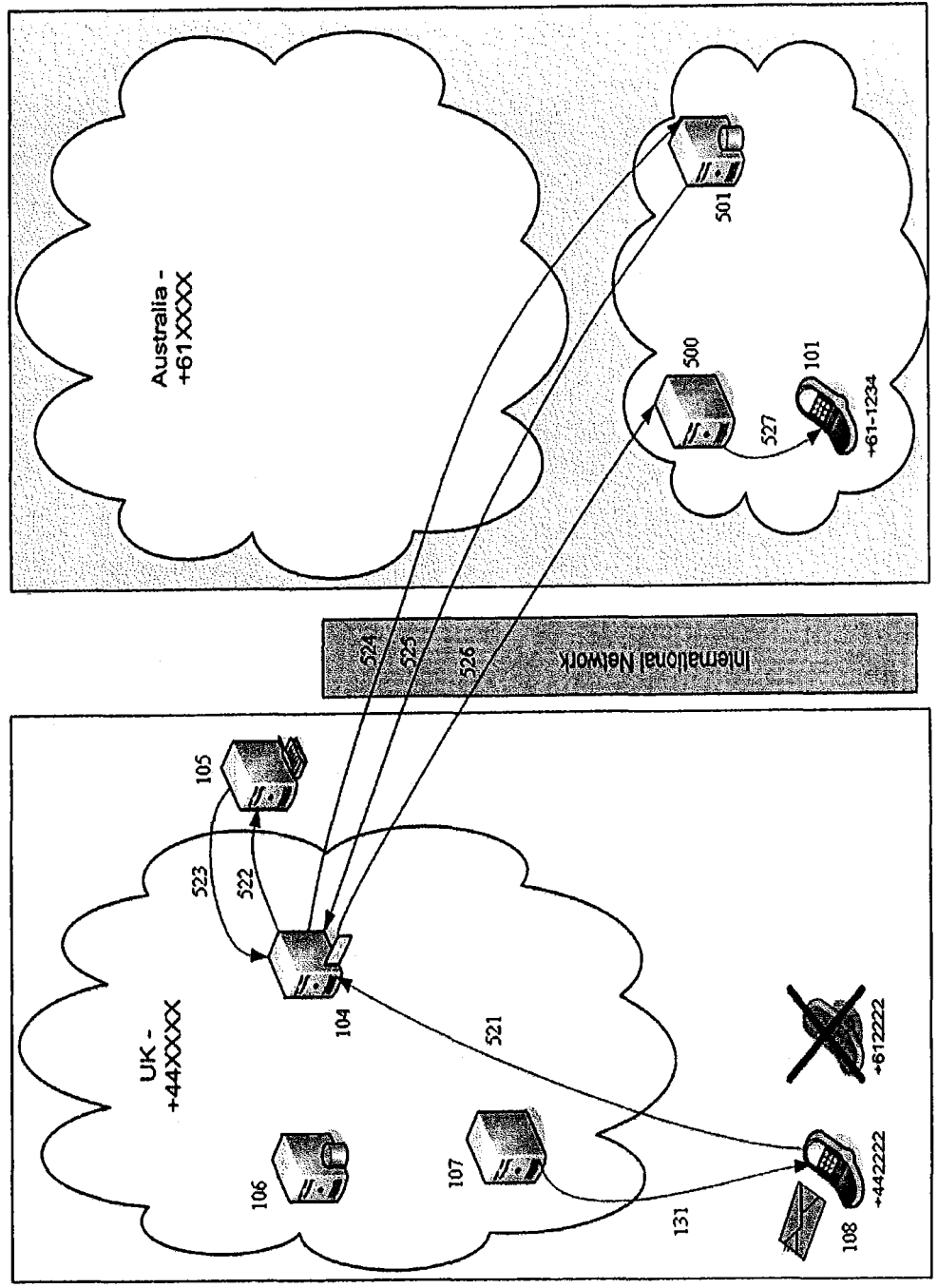
FIG. 5 depicts components and communications which can be used in delivering a message reply.

In addition to providing functionality for delivering messages to users at numbers which are not necessarily the same as those specified when the message is created, technology such as described herein can also be used for supporting return messages from those users. As an illustration of how this could take place, consider FIG. 5. In FIG. 5, once a message is delivered [131], the recipient would enter a return message, which would be sent [521] to the SMSC for the jurisdiction in which the user is located (in this case, the second SMSC [104]). The second SMSC [104] would then send [522] a message to the active subscriber identity system [105], requesting the number which should be listed as the origin for the return SMS, and potentially also sending the return SMS to the active subscriber identity system [105]. The active subscriber identity system [105] would then respond by sending [523] the number which should be used as the origin number on the return SMS. For example, the active subscriber identity system [105] could determine the geographic location of the destination on the return SMS, then check to see if the subscriber was associated with any numbers in that jurisdiction. If the subscriber was associated with any numbers in that jurisdiction, the active subscriber identity system [105] could return one of those numbers, which could potentially allow the subscriber to avoid international roaming charges by sending the return SMS such that it appeared to originate in the same jurisdiction as its destination. Similarly, in some cases, an active subscriber identity system [105] could keep a record of SMS messages, which the system could use to identify the message as a reply SMS, and to identify the number that was originally entered as the destination of the SMS being replied to.

Whatever approach is used in a particular implementation, once the appropriate origin number had been sent [523] by the active subscriber identity system [105], the second SMSC [104] could modify the SMS message so that that number appears as the origin number, and send [524] a request to the HLR [501] in the destination jurisdiction for the address of the MSC serving the destination number. Once the address had been returned [525], the second SMSC [104] could send [526] the SMS message to the MSC [500] serving the destination number, which could deliver [527] that message to the handset [101] of the recipient.

Of course, it should be understood that the diagram of FIG. 5, along with the accompanying discussion, is intended to be illustrative only, and that variations will be immediately apparent to, and could be implemented without undue experimentations by, one of ordinary skill in the art based on this disclosure. For example, while the discussion of FIG. 5 focused on a single SMSC implementation, it is possible that multiple SMSC systems such as illustrated in FIGS. 3, 4a, and 4b could be implemented so that communications could be channeled between those SMSC using low cost protocols to reduce overall expense. Similarly, the inventors' technology could also support implementations in which additional devices are used to perform the functions described. For example, an active subscriber identity system [105] could be separated into multiple systems, one of which could perform functions of storing SMS messages pending delivery, and one of which would store information about active subscribers, rather than combining those systems as described.

Figure 7A:
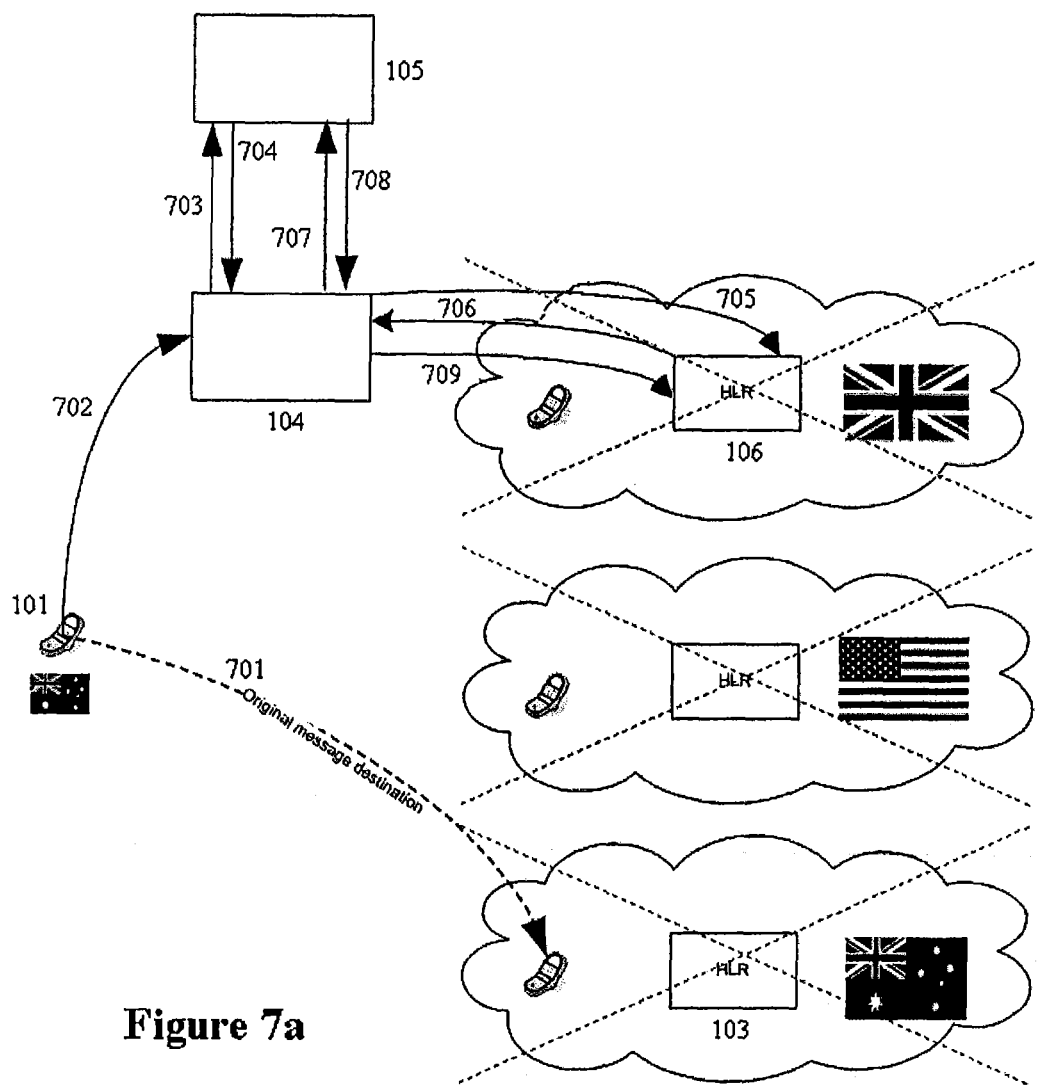
FIGS. 7a-7b depict components and communications which could be used in delivering a message to a recipient who is unavailable at the time the message is sent.

As another example of a variation which could be implemented based on the disclosure set forth herein, a system for message delivery (including redelivery or retries) could be scaled up to include more than the two networks used in the example of FIGS. 1-4b. As an illustration of this, consider the diagrams of FIGS. 7a and 7b, which present a high level depiction of components and interactions which could be used to scale the disclosed technology to operate over three (or more) networks in different jurisdictions. In the scenario of FIG. 7a, a sender initially tries to send [701] a message to a number associated with a network in Australia. However, as shown in that figure, when the message is sent, the number that the message is sent to is inactive. As a result, the request will be sent [702] to a SMSC maintained by the subscriber's service provider [104]. That SMSC [104] would then query [703] the active subscriber identity system [105] to identify the last known active number for the subscriber. The active subscriber identity system [105] responds [704] by informing the SMSC [104] of the last known active number which, in the scenario shown in FIG. 7a, is located in the UK. The SMSC [104] then requests [705] the location of the MSC serving the last known active number, such as by using an SRI_SM. The HLR [103] would then respond [706], either by giving a destination MSC which (given that the scenario of FIG. 7a is one in which there is no currently active number) could be tried for an unsuccessful delivery attempt, or by sending a message that the number is not currently active. The SMSC [104] would then send [707] a message to the active subscriber identity system [105] indicating that there is a message waiting for the UK MSISDN (as that was the most recently active number). The active subscriber identity system [105] could acknowledge [708] that message, and the SMSC [104] could store the message which was originally sent to the subscriber's Australian number. The SMSC [104] could also send [709] a message to the UK HLR [106] to set the message waiting flag for the UK MSISDN.

Figure 7B:
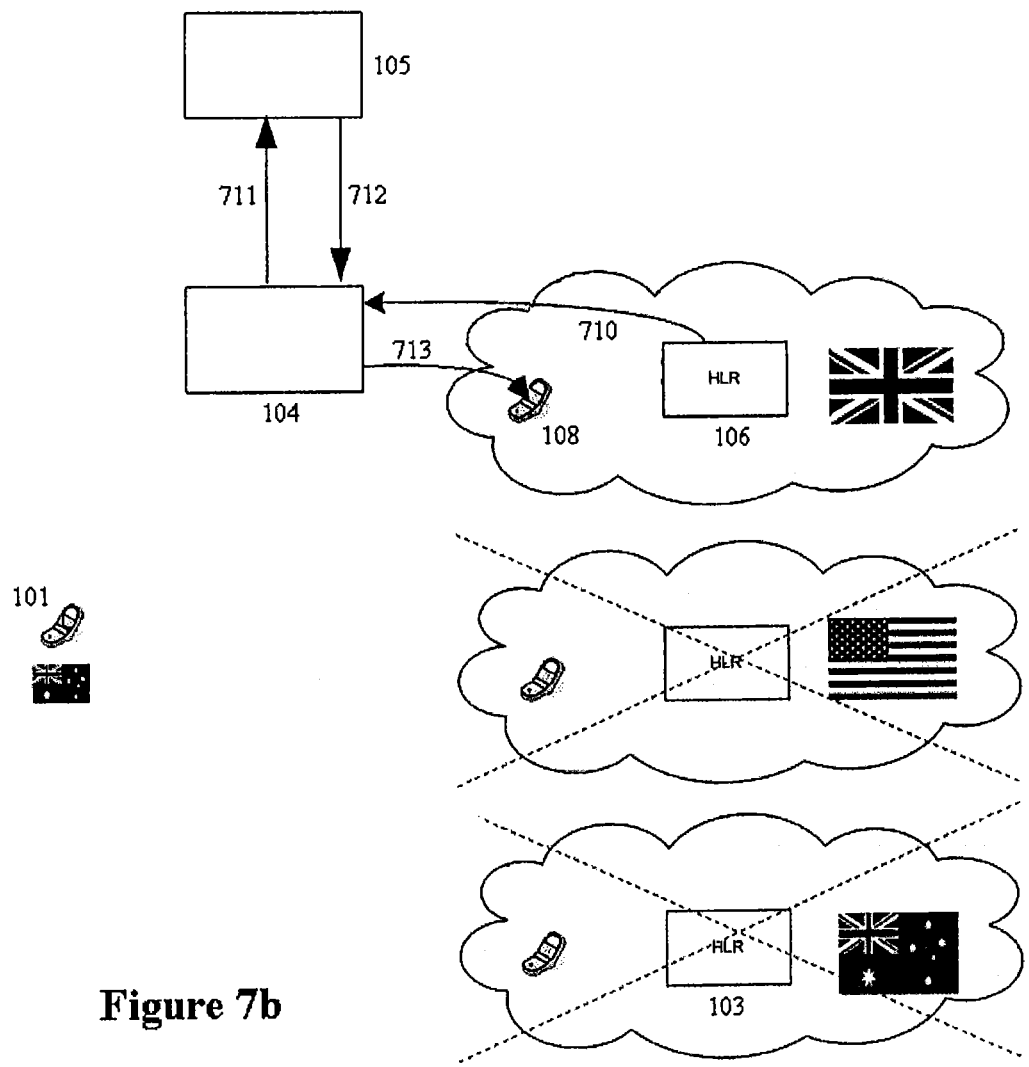

Moving now to FIG. 7b, that figure depicts communications which might take place once the subscriber turns his or her handset on. Once the subscriber turns his or her handset on (for example, with the active number being the UK MSISDN, as shown in FIG. 7b), the HLR for the jurisdiction of the subscriber's active number (in this case, the UK) would send a notification [710] that the subscriber is back on the network. Using prior art systems, this would not result in the message being delivered to the subscriber, as the message was originally sent to the subscriber's Australian number, and the number which was activated was the number for the UK. However, in an implementation following FIG. 7b, rather than simply checking for message stored for the UK number, the SMSC [104] could request [711] (e.g., using a SOAP message) that the active subscriber identity system [105] inform it of all of the phone numbers for the subscriber associated with the phone number that was activated. The active subscriber identity system [105] could then respond [712] with all the numbers associated with the subscriber. In the case of FIG. 7b, this could include the Australian number the message was originally sent to, as well as numbers in other jurisdictions (e.g., a United States number). The SMSC [104] would then retrieve from its storage the messages which had been sent to the subscriber while the subscriber was unavailable, and deliver them [713] to the active number on the subscriber's handset [108]. By using this type of approach, the two network system such as shown in FIGS. 1-4b could be scaled to any number of networks, and the messages sent to a subscriber could be reliably delivered regardless of the number they were originally sent to.

Of course, it should be understood that FIGS. 7a and 7b are high level diagrams, and that they are not intended to imply that scaling to additional networks requires using the particular communications shown in those figures. For example, while FIG. 7a depicts a message being sent [702] directly from an originating mobile device [101] to a SMSC [104] that communicates with the active subscriber identity system [105], such direct communication is not a requirement. For example, as shown in FIGS. 1 and 3, it is possible that the message would first be passed through (or routed using) other components, such as the sender's serving SMSC [102], and a serving HLR [103]. Similarly, while the discussion of delivery in FIGS. 7a-7b focused on the HLR in the jurisdiction of the subscriber's last active number (i.e., the UK HLR), it is possible that other HLRs could be involved as well. For example, in some embodiments, rather than setting the message waiting flag only at the HLR of the subscriber's last active number, the SMSC [104] could set message waiting flags on the HLRs for all of the numbers associated with the subscriber, so that, regardless of which number the subscriber activates next, the HLR would send a message indicating that activation to the SMSC [104]. Other variations are also possible, and will be immediately apparent to those of ordinary skill in the art in light of the explicit disclosure of FIGS. 7a-7b, especially when considered in the context of FIGS. 1-4b. Accordingly, the discussion of FIGS. 7a-7b should be understood as being illustrative only, and not limiting.

Variations in which multiple components are combined into one are also possible. For example, in some implementations, an active subscriber identity system [105] could be combined with an intermediate SMSC (e.g., the second SMSC [104]). Also, while it is possible that subscribers might have multiple handsets (or multiple SIM cards which would be swapped out of a single mobile device to change active numbers), in some cases the subscriber might have a single phone with a single SIM where the SIM hosts multiple international mobile subscriber identities (IMSI) with associated phone numbers (referred to as MSISDN). In such a case, the phone might have a toolkit which would allow the subscriber to designate an active IMSI (and which would communicate that designation to the active subscriber identity system [105]). Combinations are also possible. For example, in some implementations, an active subscriber identity system [105] might not store messages, relying instead on some other component (e.g., an intermediate SMSC, such as the second SMSC [104]) for message storage. Variations are also possible in the types of messages handled by the system. While the discussion above focused on delivery (including redelivery and retries) of SMS messages, the same approaches, or aspects of those approaches, could be used in delivery of other types of messages, particularly fire and forget messages (of which SMS is an example) in which the sender can send a message then disconnect without affecting the message's delivery, and store and forward messages (of which SMS is an example) in which the recipient can be disconnected at the time the message is sent and the message will be automatically delivered at a later time based on the protocol used to deliver the message. As a result, the discussion above should be understood as being illustrative only, and should not be treated as implying limitations on the technology developed by the inventors.

Figure 6A:
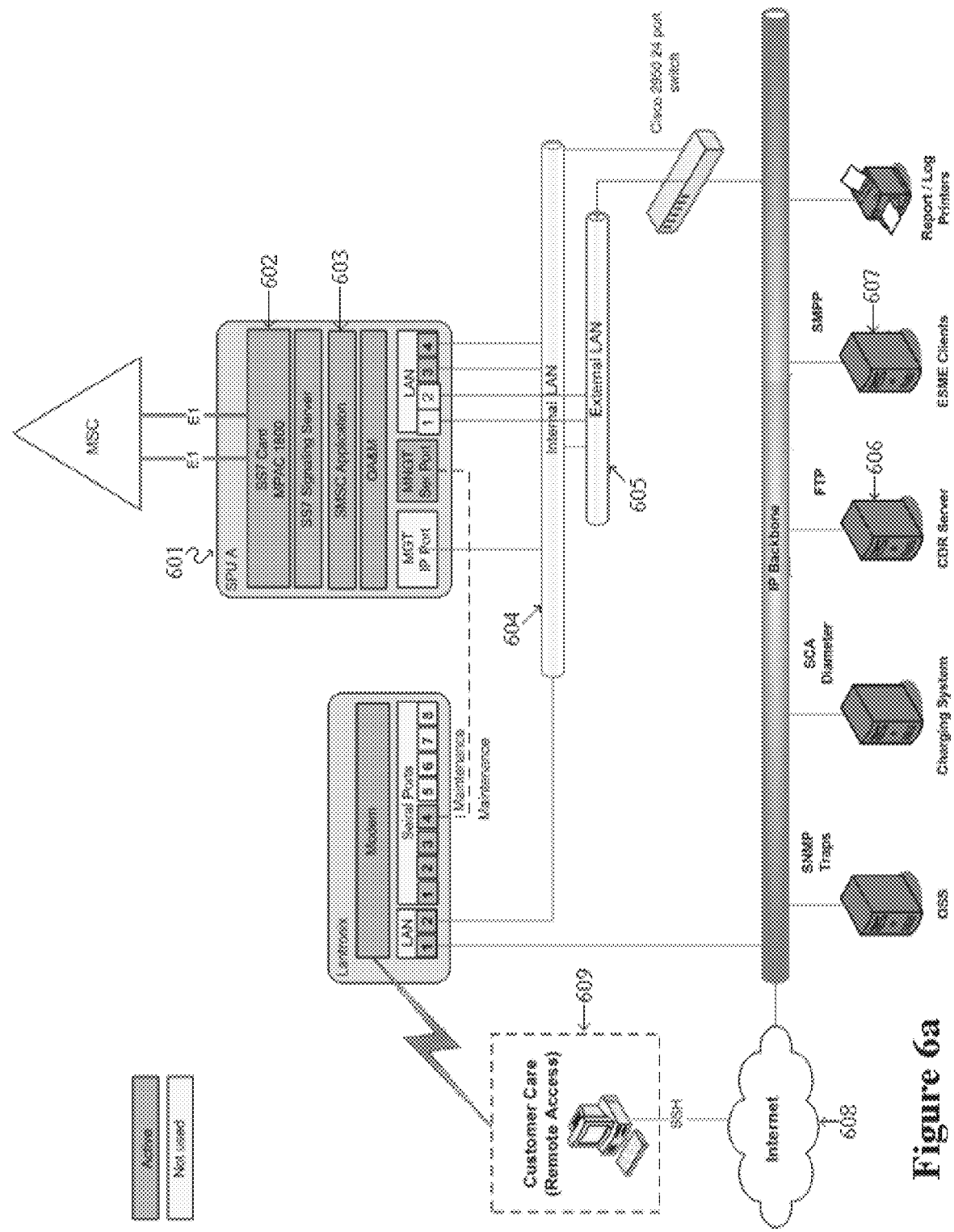
FIGS. 6a-6b depict components which could be used in an SMS service center.

Turning now to FIG. 6a, that figure provides a more detailed illustration of components which could be included in an SMSC, such as the second SMSC [104], or the local SMSC [300]. As shown in FIG. 6a, a SMSC could include a signal processing unit [601] which could include a communications device, such as an SS7 card [602] for communicating with an MSC and/or other devices (e.g., the sender's serving SMSC [102]) which use SS7 signaling to communicate message, as well as software [603] which could configure it to perform functionality such as described above with respect to FIGS. 1-4b (e.g., when
that software is retrieved from a memory and executed by a processor in the SMSC). The SMSC could also use various networks (e.g., internal LAN [604], external LAN [605], or even the Internet [608]) to communicate with external systems, such as a call detail record server [606], and/or external short message entity clients [607]. Further, in some implementations, the SMSC could also communicate with systems such as a customer care system [609], in case it appeared that there was a problem with a particular account which could be tracked to the SMSC, or to data which could be accessed through the SMSC.

Figure 6B:
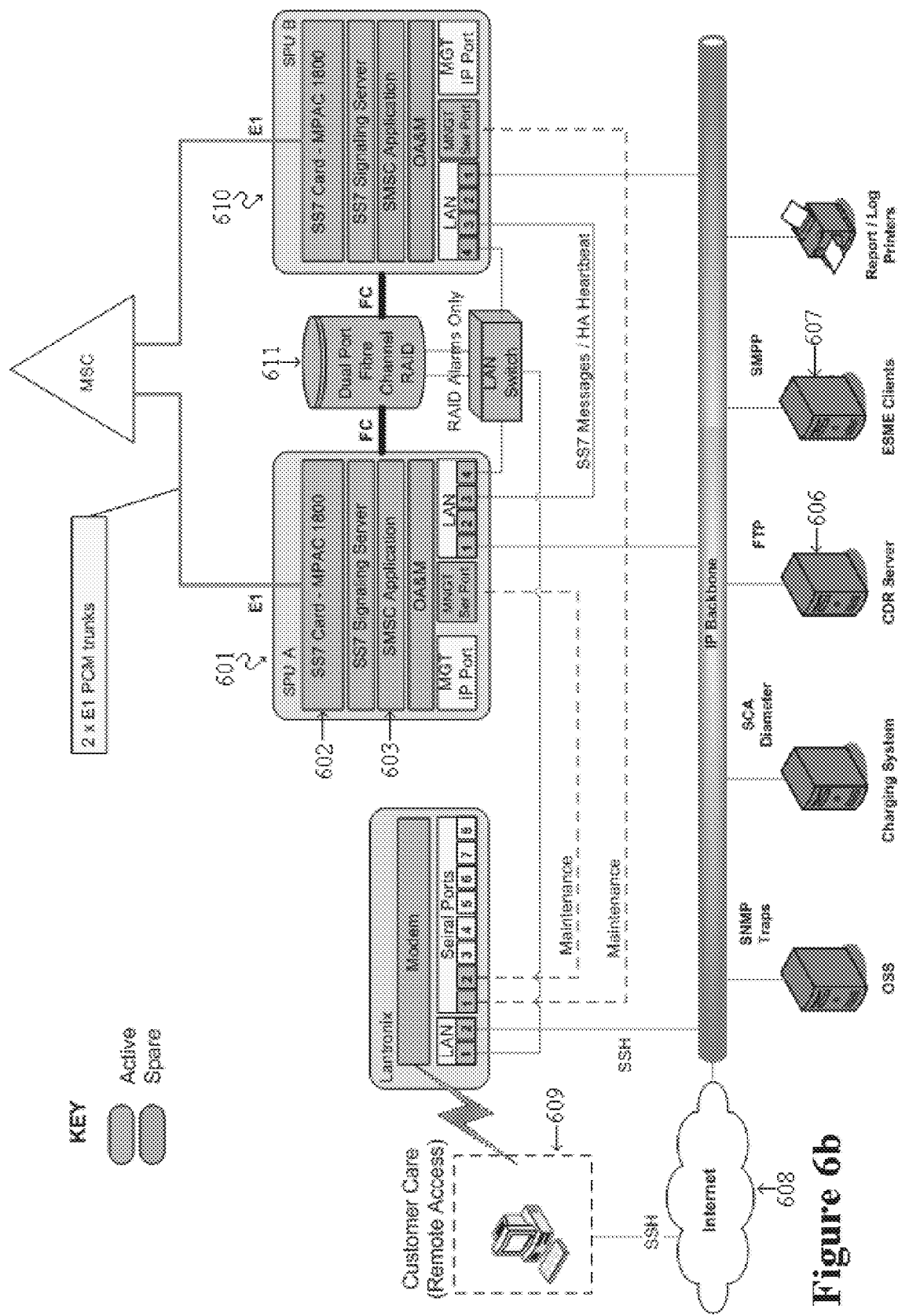

Of course, just as the higher level diagrams of FIGS. 1, 2a, 2b, 3, 4a, 4b, and 5 are intended to be illustrative only, the lower level diagram of FIG. 6a is intended to be illustrative, and should not be treated as limiting. As an example of how the diagram of FIG. 6a could be modified in certain circumstances, consider the diagram of FIG. 6b. FIG. 6b shows how the architecture of FIG. 6a could be modified to include components such as a second signal processing unit [610] and a RAID [611], which could provide additional stability, and remove the risk of a single point of failure (i.e., the signal processing unit [601]) from the architecture of FIG. 6a. Of course, other modifications (e.g., different network topologies to support communication between components, additional redundant features to further reduce the risk of failure, etc) could also be used, and will be immediately apparent to those of ordinary skill in the art in light of this disclosure.

As set forth above, the disclosure provided herein is intended to be illustrative of the inventors' technology, but it is not intended to be treated as implying limits on the inventors' technology, or on potential implementations thereof. Accordingly, instead of limiting the protection accorded by this document, or by any document which is related to this document, to the material explicitly disclosed herein, the protection should be understood to be defined by the following claims, which are drafted to reflect the scope of protection sought by the inventors in this document when the terms in those claims which are listed below under the label "Explicit Definitions" are given the explicit definitions set forth therein, and the remaining terms are given their broadest reasonable interpretation as shown by a general purpose dictionary. To the extent that the interpretation which would be given to the claims based on the above disclosure is in any way narrower than the interpretation which would be given based on the "Explicit
Definitions" and the broadest reasonable interpretation as provided by a general purpose dictionary, the interpretation provided by the "Explicit Definitions" and broadest reasonable interpretation as provided by a general purpose dictionary shall control, and the inconsistent usage of terms in the specification shall have no effect.

Explicit Definitions

When used in the claims, the definite articles "a" and "an" should be understood to mean one or more. For example, a reference to "a processor" should be understood to embrace architectures with a single "processor," as well as architectures which include multiple processors (e.g., multi-core CPUs, distributed computing architectures, etc).

When used in the claims, the modifier "active" should be understood to mean presently operable for its intended function. For example, if a cellular phone has multiple MSISDNs, and the user of that phone indicates (e.g., using a toolkit) that calls made to or from that phone should be routed as if they were directed to a specific one of those MSISDNs, then that MSISDN would be "active," while the other MSISDNs would not.

When used in the claims, a statement that a thing is "associated with" something else, means that the thing has some connection to that with which it is "associated". For example, if a database record indicates that a subscriber has purchased multiple cellular telephones, each of which has a unique MSISDN, then the subscriber is "associated with" each of those MSISDNs.

When used in the claims, a statement that something is "based on" something else should be understood to mean that something is determined at least in part by the thing that it is indicated as being "based on." When something is completely determined by a thing, it will be described as being "based EXCLUSIVELY on" the thing.

When used in the claims, a statement that an act happens "before" some subsequent act should be understood to mean that, if the subsequent act takes place, it will take place at a point in time which is later than the act which happens "before" it. The subsequent act may not take place, even if the act which happens "before" it is completed.

When used in the claims, a "computer" should be understood to refer to a combination of devices comprising a processor and a memory which is capable of performing one or more logical operations based on a set of data.

When used in the claims, a "computer readable medium" should be understood to refer to any article of manufacture (including combinations of articles of manufacture) which can be used to store or maintain data so that it can be retrieved by a computer.

When used in the claims, to "configure" a computer should be understood to refer to providing the computer with specific data (which may include instructions) which can be used in performing the specific acts the computer is being "configured" to do. For example, installing Microsoft WORD on a computer "configures" that computer to function as a word processor, which it does using the instructions for Microsoft WORD in combination with other inputs, such as an operating system, and various peripherals (e.g., a keyboard, monitor, etc. . . . ).

When used in the claims, "data" should be understood to mean information which is represented in a form which is capable of being processed, stored and/or transmitted.

When used in the claims, a "delivery confirmation" for a message should be understood to refer to a communication indicating that the message has been provided to the message recipient.

When used in the claims, to "execute" an instruction should be understood to mean performing the operation called for by that instruction.

When used in the claims, a statement that something is "in communication with" something else should be understood to mean that the two things are communicatively coupled (e.g., through a bus) such that they are capable of, directly or indirectly, transferring information to and receiving information from one another.

When used in the claims, a statement that an act is performed "in response to" something means that the act is triggered at least in part by that which it is "in response to."

When used in the claims, "instructions" should be understood to refer to data which describes operations which a device which executes those "instructions" (e.g., a processor) is to perform.

When used in the claims, "IP signaling" should be understood to refer to communicating information using a connectionless protocol used for transferring data as packets between computers.

When used in the claims, a "memory" should be understood to refer to an object, substance, or combination of objects or substances, capable of storing data or instructions in a form in which they can be retrieved and/or processed by a device. A "memory" not be limited to any particular type or organization, and should be understood to include distributed and decentralized systems however they are physically or logically disposed, as well as storage objects of systems which are located in a defined and/or circumscribed physical and/or logical space. Examples of "memory" include hard drives, solid state memories, optical disc memories, random access memory, and tape drives.

When used in the claims, a "message" should be understood to refer to a defined unit of communication.

When used in the claims, a "message body" should be understood to be information communicated by a message. For example, when using SMS to send the text "Happy Christmas" from one mobile phone to another, the "message body" of the message would be "Happy Christmas".

When used in the claims, a "message recipient" should be understood to be data which indicates where a message should be delivered. For example, in an SMS message, the phone number of the device where the message body should be displayed (in the case of a displayable message) would be considered the "message recipient." The term "message recipient" also embraces data which is treated as indicating where the message should be delivered, even if that data is inaccurate (e.g., because the original "message recipient" was replaced while the message is in transit).

When used in the claims, a "message sender" should be understood to be data which indicates where a message originates. For example, in an SMS message, the phone number of the device the message is sent from would be considered the "message sender." The term "message sender" also embraces data which is treated as indicating where the message originates, even if that data is inaccurate (e.g., because the original "message sender" was replaced while the message is in transit).

When used in the claims, a "MSISDN" should be understood to refer to a number which identifies one (and only one) subscription in a mobile network. The phone number of a cellular phone is an example of an "MSISDN."

When used in the claims, "network interface" should be understood to refer to a device which is installed in another device that can allow communication of information over a network. Examples of "network interfaces" include modems, and SS7 cards.

When used in the claims, the verb "parse" (and various forms thereof) should be understood to mean dividing data into constituent parts that are susceptible of further processing. It should be understood that "parsing" might also include other acts necessary to extract meaning from the data, such as decrypting, decompressing, or translating that data.

When used in the claims, "processor" should be understood to mean a device (or combination of devices) which can read instructions and perform operations (or cause operations to be performed) based on those instructions.

When used in the claims, the verb "provide" should be understood to refer to the act of delivering or furnishing the thing "provided," either directly, or through some intermediary.

When used in the claims, a statement that an act is performed "regardless" of some condition should be understood to mean that whether (or to what extent) the condition is true has no influence on whether the act is performed.

When used in the claims, a statement that a message is a "reply" to an earlier message should be understood to mean that the later message is sent from the target of the earlier message, that it is sent to the originator of the earlier message, and that it is sent as a response to the target of the earlier message receiving that message (e.g., by selecting a "reply" button on an e-mail after reading the contents of the email).

When used in the claims, a statement that something is "remote" from something else should be understood to mean that the two things are in geographically distinct locations, and that communication between them takes place across a network.

When used in the claims, an "SMS message" should be understood to refer to a message sent using the Short Message Service features included in mobile telephones or similar devices.

When used in the claims "SS7 signaling" should be understood to refer to sending information using a channel specified for transmission of control information in a telecommunications network (e.g., a band used for out of band signaling for a voice telephone call).

When used in the claims, the verb "store" (and various forms thereof) should be understood to refer to the act of preserving or maintaining, however brief in duration that act might be.

When used in the claims, a "store and forward message" should be understood to refer to a message where, if the recipient is disconnected at the time the message is sent, the message will be automatically delivered at a later time based on the protocol used to deliver the message When used in the claims, "subscriber" should be understood to refer to an individual who is authorized to receive communications on a communication network. An individual who has signed up for wireless service, and been assigned (or selected) a MSISDN is an example of a "subscriber."

What is claimed is:

1. A system for automatic delivery of messages, the system comprising:
    a sending device capable of receiving and sending a message to a known recipient number;
    a sender short message service center (SMSC) configured to receive and forward the message and the known recipient number from the device;
    a serving home location register (HLR) configured to perform the following tasks:
        receive the known recipient number from the sender SMSC;
        determine that the known recipient number is associated with a recipient having a plurality of recipient numbers; and
        forward a first request sent from the sender SMSC;
    a recipient SMSC configured to perform the following tasks:
        receive the first request from the serving HLR;
        send a response to the sender SMSC indicating the message should be delivered to the recipient SMSC;
        after receipt of the message from the sender SMSC, send a delivery confirmation to the sender SMSC indicating the message has been delivered to the recipient SMSC
        transmit a second request; and
        transmit a third request;
    an active subscriber identity system configured to perform the following tasks:
        receive the second request from the recipient SMSC; and
        send a response to the recipient SMSC identifying an active recipient number from the plurality of recipient numbers;
    a mobile switching center (MSC);
    a local HLR configured to perform the following tasks:
        receive the third request from the recipient SMSC, wherein the third request includes a query for the mobile switching center (MSC) serving the active recipient number;
        send a response to the recipient SMSC; and wherein the MSC is configured to perform the following tasks:
            receive the message and active recipient number from the recipient SMSC; and
            deliver the message to the active recipient number,
    wherein the delivery confirmation is sent to the sender SMSC before the message is delivered to the active recipient number, the message is sent using internet protocol (IP) signaling, the known recipient number is different from the active recipient number, the response sent from the local HLR to the recipient SMSC is that the active recipient number is unavailable, and the recipient SMSC forwards the message to be stored on the local HLR and notifies the active subscriber identity system that the active recipient number was unavailable.

2. The system of claim 1, wherein the message is a SMS message.

3. The system of claim 1, wherein
the known recipient number is associated with a first geographic area and the active recipient number is associated with a second geographic area that is different from the first geographic area.

4. The system of claim 1, wherein the response sent from the local HLR to the recipient SMSC includes the address for a MSC associated with the active recipient number.

5. The system of claim 1, wherein the active recipient number becomes available and a recipient device associated with the active recipient number is configured to notify the active subscriber identity system that the active recipient number is available, wherein the active subscriber identity system is configured to determine that the message is being stored and notifies the recipient SMSC that the active recipient number is available, wherein the recipient SMSC is configured to request the identity of a MSC associated with the active recipient number from the local HLR, wherein the local HLR is configured to identify the MSC to the recipient SMSC, wherein the recipient SMSC is configured to forward the message to the MSC, and wherein the MSC is configured to forward the message to the active recipient number.

6. A method for automatically delivering messages to an active recipient number, the method comprising the steps of:
sending a message from a sending device to a known recipient number;
receiving the message on a sender short message service center (SMSC) associated with the sending device;
forwarding the message and the known recipient number from the sender SMSC to a serving home location register (HLR), wherein the serving HLR performs the following steps:
receiving the known recipient number from the sender SMSC;
determining that the known recipient number is associated with a recipient having a plurality of recipient numbers; and
forwarding a first request sent from the sender SMSC;
receiving the first request from the serving HLR on a recipient SMSC, wherein the recipient SMSC performs the following steps:
sending a response to the sender SMSC indicating the message should be delivered to the recipient SMSC;
after receiving the message from the sender SMSC, sending a delivery confirmation to the sender SMSC indicating the message has been delivered to the recipient SMSC;
transmitting a second request; and
transmitting a third request;
receiving the second request from the recipient SMSC on an active subscriber identity system;
sending a response from the an active subscriber identity system to the recipient SMSC identifying an active recipient number from the plurality of recipient numbers;
receiving the third request from the recipient SMSC on a local HLR, wherein the local HLR performs the following tasks:
sending a response to the recipient SMSC;
forwarding the message and active recipient number from the recipient SMSC to a serving mobile switching center (MSC); and
delivering the message to the active recipient number,
wherein the delivery confirmation is sent to the sender SMSC before the message is delivered to the active recipient number, the message is sent using internet protocol (IP) signaling, the known recipient number is different from the active recipient number, and wherein the method comprises the additional steps of:
before delivering the message to the active recipient number, sending a notification from the local HLR to the recipient SMSC that the active recipient number is unavailable;
forwarding the message from the recipient SMSC to the local HLR;
storing the message on the local HLR; and
notifying the active subscriber identity system that the active recipient number was unavailable.

7. The method of claim 6, wherein the message is a SMS message.

8. The method of claim 6, wherein
the known recipient number is associated with a first geographic area and the active recipient number is associated with a second geographic area that is different from the first geographic area.

9. The method of claim 6, comprising the additional steps of:
before delivering the message to the active recipient number, sending the address of the MSC associated with the active recipient number from the local HLR to the recipient SMSC;
forwarding the message from the recipient SMSC to the MSC; and
delivering the message from the MSC to the active recipient number.

10. The method of claim 6, comprising the additional steps of: determining when the active recipient number becomes available;
notifying the active subscriber identity system that the active recipient number is available;
notifying the recipient SMSC that the active recipient number is available;
requesting the identity of a MSC associated with the active recipient number from the local HLR;
identifying the MSC to the recipient SMSC;
forwarding the message from the recipient SMSC to the MSC; and
delivering the message to the active recipient number.

* * * * *